United States Patent

[11] 3,549,965

| [72] | Inventor | Gerhard Hausmann |
| --- | --- | --- |
| | | Munich, Germany |
| [21] | Appl. No. | 706,478 |
| [22] | Filed | Feb. 19, 1968 |
| [45] | Patented | Dec. 22, 1970 |
| [73] | Assignee | Siemens Aktiengesellschaft |
| | | a corporation of Germany |
| [32] | Priority | Feb. 22, 1967 |
| [33] | | Germany |
| [31] | | No. S108,447 |

[54] SYNCHRONOUS AND ASYNCHRONOUS MOTORS CONNECTED TOGETHER FOR A CONSTANT SPEED OUTPUT
4 Claims, 1 Drawing Fig.

| [52] | U.S. Cl. | 318/47 |
| --- | --- | --- |
| [51] | Int. Cl. | H02k 17/36 |
| [50] | Field of Search | 318/47 |

[56] References Cited
UNITED STATES PATENTS

| 551,863 | 12/1895 | Hutin | 318/47 |
| --- | --- | --- | --- |
| 1,331,940 | 2/1920 | Hobart | 318/47 |

FOREIGN PATENTS

| 313,524 | 5/1930 | Great Britain | 318/47 |
| --- | --- | --- | --- |
| 533,265 | 5/1929 | Germany | 318/47 |
| 592,380 | 2/1934 | Germany | 318/47 |

*Primary Examiner*—Oris L. Rader
*Assistant Examiner*—Alfred G. Collins
*Attorney*—Hill, Sherman, Meroni, Gross & Simpson ABSTRACT: A constant speed plural motor system including a synchronous motor and an asynchronous motor, a gear train connecting the synchronous and asynchronous motors to a highly variable load. The synchronous motor acts partly as a generator and partly as a motor with a capacity corresponding to less than half the maximum load to be delivered and of the asynchronous motor delivering power corresponding to the difference between the maximum load to be delivered and the capacity of the synchronous motor. The gear train adjusts the speed of the asynchronous motor at which it delivers the desired performance to the speed of the synchronous motor. The invention also includes the method of driving a highly variable load at constant speed.

PATENTED DEC 22 1970    3,549,965
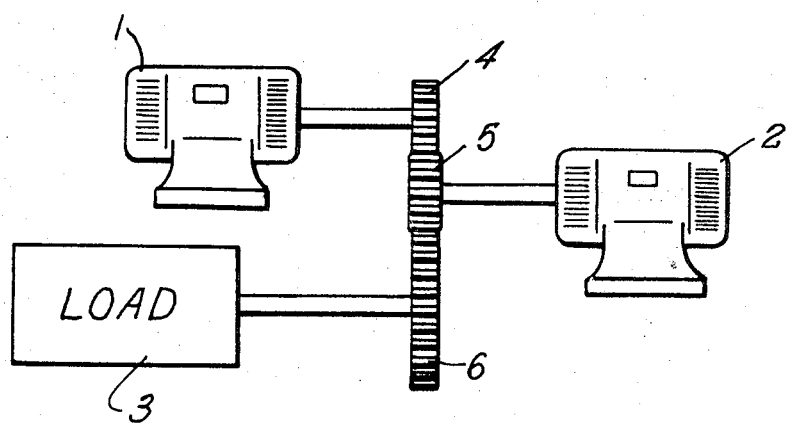
INVENTOR.
Gerhard Hausmann
BY [signature] ATTORNEYS

SYNCHRONOUS AND ASYNCHRONOUS MOTORS CONNECTED TOGETHER FOR A CONSTANT SPEED OUTPUT

BACKGROUND OF THE INVENTION

1. Field of the Invention

This invention pertains to a method and system for driving a highly variable load at a constant speed, and more particularly a method and system for connecting a synchronous and an asynchronous motor to a load.

2. Prior Art

It is known to control motor speed with regulators of the contact type, voltage regulators, and synchronous motors. The contact type which includes centrifugal devices, present high wear and tear problems. The voltage regulators require additional apparatus of the phase sensing type such as tachometer-generators, or feedback networks of the voltage and current type.

In tachometer-generator-type systems, the principle is to generate a frequency directly proportional to the speed of the mechanical system and to match the frequency and phase with those of a stable oscillator. A phase displacement between the two will cause the variable-speed motor to advance or retard sufficiently to correct any phase displacement. Another method of speed control is with an eddy-current brake. The braking power can be as much as ten times the electrical power applied to the brake. Such arrangements may be classed as servosystems involving error detectors and correctors. They are especially helpful in any system where there is a tendency for the load to reflect back into the motor.

Synchronous motors maintain their turning speed within a predetermined load range without additional aids, but they are relatively large if they are sized to provide the total power required by the load.

In synchronous motors alternating current is supplied to one winding, the armature, and direct current to the field winding. The direct current winding for the field is generally placed on the rotor. There is an induced counter-e.m.f. in the armature winding of the synchronous motors similar to that in a synchronous generator. In order that the counter-e.m.f. and the impressed armature voltage may enter into an appropriate Kirchhoff law balance in the steady state, there is a relationship between operating speed and the impressed frequency which is constant for synchronous motors, that is, synchronous motors operate at an absolutely constant average speed determined by the number of poles and the impressed frequency. Significant departure from the constant speed caused by electrical or mechanical disturbances result in loss of motor action and shutdown of the machine.

It is also known to use synchronous motors to drive such mechanisms as scanning and recording motors. Such synchronous motors may be of the induction motor type having a slotted rotor. The induction motor action serves to start and drive the rotor close to synchronous speed. Slots in the rotor equal to the number of stator poles form a salient pole rotor which will advance one pole for each pulse of the alternating current driving power which poles the rotor into synchronous speed after starting.

It is known in some cases where there is a problem of supplying sufficient power from a single synchronous motor to use an auxiliary motor to supply slightly more or slightly less than the average mechanical requirements of the load.

SUMMARY

The invention makes use of the property of synchronous motors that without changing of the turning speed they can deliver electrical power, but also when absorbing mechanical power while delivering electrical power.

It is a principle object of the present invention to provide a system for obtaining a constant speed output from plural motors.

A further object of the present invention is to obtain a constant speed from plural motors of the synchronous and asynchronous types.

Still another object of the present invention is to drive a highly fluctuating load at a constant speed by means of a synchronous and an asynchronous motor wherein the synchronous motor may act as a synchronous generator to absorb mechanical power dependent on the load requirements.

Yet a further object of the present invention is to provide a constant speed plural motor system in which the constant speed of a synchronous motor is combined with the power delivering capabilities of an asynchronous motor to drive a highly variable load at a constant speed.

Another object of the present invention is to provide a plural motor system in which at least one of the motors is a synchronous type and capable of acting as a motor or generator dependent on the load requirements.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWINGS

The FIG. is a block diagram of a constant speed plural motor system in accordance with the principles of the invention.

AS SHOWN IN THE DRAWINGS

The principles of this invention are particularly useful when embodied in a constant speed plural motor system as illustrated in the FIG. The motor system includes a pair of interconnected asynchronous and synchronous motors 1 and 2 for driving a load apparatus 3 which may be a mechanical data printer. The load 3 requires for operation at constant speed differing drive powers.

The motors 1 and 2 are combined such that the asynchronous motor 1 is engaged with the synchronous motor 2 by means of a gear train including a gear 4 mounted on the rotor of the asynchronous motor 1 and a gear 5 mounted on the rotor of the synchronous motor 2. The gears 4 and 5 are provided to compensate for the different speeds of the motors 1 and 2 as even with the same number of poles, the motors 1 and 2 will have different speeds.

The asynchronous motor 1 can deliver power $N_{As}$ only if the revolving field of the armature is somewhat slower than the rotary field.

The gear 5 driven by the rotor of the synchronous motor 2 is engaged with a gear 6 to drive a shaft connected to the load apparatus 3.

The maximum deliverable power $N_k$ to the driven apparatus 3 is the sum of the nominal capacities of the motors 1 and 2. If the load to be delivered to the apparatus 3 decreases, then the power delivered from the asynchronous motor 1 remains constant, since a constant turning rate is assumed. Alternatively, the power delivered by the synchronous motor 2 decreases with the lessened requirement from the apparatus 3, and if the power requirements of the apparatus 3 becomes small enough the synchronous motor 2 will absorb mechanical power and generate electrical power at a constant speed. absorb about 1.5 times the value of the deliverable mechanical power without dropping out of step. The synchronous motor 2 has a capacity corresponding to less than half the load to be delivered as a maximum. The asynchronous motor 1 delivers power corresponding to the difference between the maximum total performance to be delivered and the performance the synchronous motor 2 is capable of delivering. By the gears 4, 5 and 6 the speed of the asynchronous motor 1 is adjusted such that it delivers the desired power to the constant speed of the synchronous motor 2. The gear train including gears 4 and 5 comprise a force-locking connection of the asynchronous motor 1 and synchronous motor 2 to achieve a constant r.p.m. There is thus provided a constant slip for the asynchronous motor 1 which slip determines the performance or power $N_{As}$. Thus, load changes do not reflect themselves in the load or delivered performance $N_{As}$ of the asynchronous motor 1 as the synchronous motor 2 automatically adjusts for the load changes.

If the load on the motors 1 and 2 drops below the performance $N_{As}$ as delivered under the forced slip, the synchronous motor 2 will absorb mechanical performance $N_{SyGen}$. The synchronous motor 2 then operates as a generator and delivers electrical power in accordance with its capacity to the power line.

The maximum performance $N_k$ the drive system is able to deliver, rated capacity, is the sum of the rated performance of the asynchronous motor and the synchronous motor as delivered at the determined slip from the asynchronous motor. The minimum performance $N_L$ to be delivered without increase of the speed results from the difference of the performance $N_{As}$ delivered by the synchronous motor 1 and the performance $N_{SyGen}$ absorbable as the maximum by the synchronous motor when operating as a generator. The formula to represent this is $$N_L = N_{As} - N_{SyGen}$$

Considering that $N_{SyGen}$ is approximately equal to 1.5 $N_{Sy}$, where $N_{Sy}$ is the rated performance of the synchronous motor, the result will be $$N_L \approx N_{As} - 1 \cdot 5 N_{Sy}$$

The idling load may, if desired, be made equal to zero.

Despite splitting of the motors according to the invention the entire structural volume of the two motors remains substantially below the volume of a single synchronous motor which would have to do the entire driving work for the highly variable load apparatus 3. Moreover, the division into two motors offers in many cases a facility when installing the drive system into an appliance.

The method of driving a load at a constant speed with plural motors includes connecting a synchronous and an asynchronous motor to a gear train, driving a highly variable load through the gear train, operating the synchronous motor partly as a motor and partly as a generator with a capacity corresponding to less than half the load to be supplied to the fluctuating load as a maximum. The method further includes the asynchronous motor delivering a portion of the load corresponding to the difference between the maximum total load to be delivered and the load the synchronous motor is capable of delivering and adjusting the speed of the asynchronous motor, at which the asynchronous motor delivers the desired load to the speed of the synchronous motor.

Although minor modifications might be suggested by those versed in the art, it should be understood that I wish to embody within the scope of the patent warranted hereon all such embodiments as reasonably and properly come within the scope of my contribution to the art.

I claim:

1. A constant speed plural motor system comprising:
    a variable load which requires delivering thereto of a maximum power $N_K$ and a minimum power $N_L$;
    a synchronous motor for connection to an electrical supply main and having a nominal power $N_{Sy}$ which is less than 50 percent of the difference between the maximum power $N_K$ and the minimum power $N_L$ required by the load;
    an asynchronous motor for connection to the same electrical supply main as said synchronous motor and having a nominal power $N_{As}$; and
    gear means for coupling together said synchronous motor, said asynchronous motor and said variable load, said gear train providing a locked-slip condition for said asynchronous motor and thereby having a constant gear ratio which corresponds to the ratio of turning speed of said synchronous motor and the turning speed of the asynchronous motor to effect a power delivery of said asynchronous motor which is no greater than its nominal power $N_{As}$ and which is independent of load fluctuations of the motor system.

2. A constant speed plural motor system as recited in claim 1 wherein said gear means includes a first gear, said first gear driven by said asynchronous motor, a second gear driven by said synchronous motor and in engagement with said first gear, and a third gear driving said load and in engagement with said second gear.

3. A method of driving a highly variable load at a constant speed with an asynchronous motor and a synchronous motor, comprising the steps of:
    connecting the synchronous motor, the asynchronous motor and the variable load together through a gear train to place the motors in driving engagement with the variable load;
    operating the synchronous motor and the asynchronous motor from the same electrical supply; and
    adjusting the speed of the asynchronous motor to that of the synchronous motor to effect a substantially constant power delivery from the asynchronous motor and a variable power delivery from the synchronous motor in accordance with the power delivery requirements of said variable load.

4. A method of driving a load at a constant speed with plural motors as recited in claim 3 wherein the step of adjusting the asynchronous motor speed is by connecting the synchronous motor between the asynchronous motor to the gear train and the load.